(12) United States Patent
Karlsson et al.

(10) Patent No.: US 6,470,462 B1
(45) Date of Patent: Oct. 22, 2002

(54) SIMULTANEOUS RESYNCHRONIZATION BY COMMAND FOR STATE MACHINES IN REDUNDANT SYSTEMS

(75) Inventors: Marcus Karlsson; Patrik Rynbäck, both of Luleå (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 09/257,233

(22) Filed: Feb. 25, 1999

(51) Int. Cl.[7] .................................................. H02H 3/05
(52) U.S. Cl. ........................ 714/11; 714/801; 711/114; 375/354; 370/350
(58) Field of Search .............................. 714/11, 6, 7, 9, 714/10, 12, 32, 37, 801, 766; 711/114; 375/354; 370/350

(56) References Cited

U.S. PATENT DOCUMENTS

| | | | |
|---|---|---|---|
| 4,569,017 A | * 2/1986 | Renner et al. | 709/400 |
| 4,635,186 A | * 1/1987 | Oman et al. | |
| 4,733,353 A | 3/1988 | Jaswa | |
| 5,301,308 A | 4/1994 | Daar et al. | |
| 5,428,637 A | * 6/1995 | Oliva, Jr. et al. | 375/202 |
| 5,452,441 A | 9/1995 | Esposito et al. | |
| 5,469,503 A | 11/1995 | Butensky et al. | |
| 5,579,220 A | 11/1996 | Barthel et al. | |
| 5,583,986 A | 12/1996 | Park et al. | |
| 5,680,594 A | * 10/1997 | Charneski et al. | 713/501 |
| 5,748,873 A | 5/1998 | Ohguro et al. | |
| 5,841,963 A | 11/1998 | Nakamikawa et al. | |
| 6,223,304 B1 | * 4/2001 | Kling et al. | 714/12 |

FOREIGN PATENT DOCUMENTS

| | | |
|---|---|---|
| GB | 2 308 040 A | 6/1997 |
| WO | 96/02115 | 1/1996 |

* cited by examiner

Primary Examiner—Robert Beausoleil
Assistant Examiner—Rita Ziemer
(74) Attorney, Agent, or Firm—Nixon & Vanderhye, P.C.

(57) ABSTRACT

A redundant system (20) comprises a first unit (21), a second unit (22), and a synchronization server (24). The first unit (21) and a second unit (22) each include plural state machines (SMs) for performing tasks. At least some of the state machines provided at the first unit simultaneously perform same tasks as at least corresponding ones of some of the state machines provided at the second unit. When a state machine of the second unit needs to be resynchronized, the synchronization server (24) receives a resynchronization request (2–1) from the resync requesting state machine of the second unit and thereupon provides an out-of-synchronization indication (2–2) to a corresponding state machine of the first unit. In response to the out-of-synchronization indication (2–2) from the synchronization server, the corresponding state machine of the first unit generates a resynchronization request (2–3) at an time deemed appropriate by the corresponding state machine. In response to the resynchronization request (2–3) from the corresponding state machine, the synchronization server issues a resynchronization command (2–4) to both the resync requesting state machine of the second unit and the corresponding state machine of the first unit, thereby causing simultaneous resynchronization. At least one of the first unit and the second unit includes restart logic that prescribes an order of restart of the plural state machines, thereby providing a gradual start up of the state machines of the redundant units. Thereafter each of the plural state machines controls its own resynchronization.

34 Claims, 8 Drawing Sheets

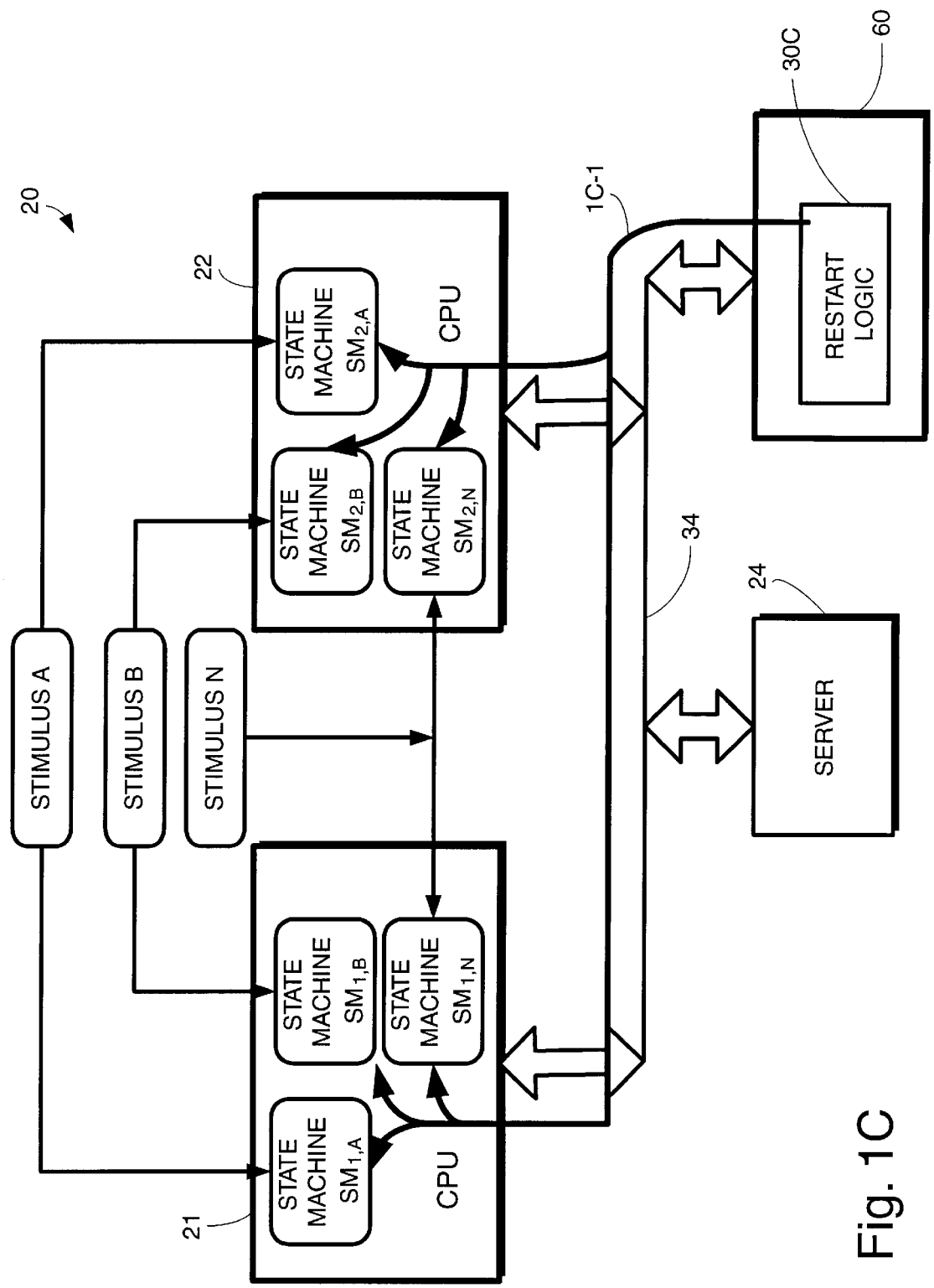

SIMULTANEOUS RESYNCHRONIZATION BY COMMAND FOR STATE MACHINES IN REDUNDANT SYSTEMS

BACKGROUND

1. Field of the Invention

The present invention pertains to synchronizing of a redundant system, and particularly to synchronizing of a redundant computer system having two independent units which execute the same tasks simultaneously.

2. Related Art and other Considerations

Some activities are so supremely important that it is judicious to have two units or processors for performing the activities, just in case one of the units malfunctions or terminates (e.g., crashes). Such is expected to be the case in future generations of mobile telecommunications systems, for example. See U.S. Pat. No. 5,469,503 to Butensky et al. which discloses a recovery algorithm for a redundant system in a telecommunications environment.

In such mission critical situations, multiple units (e.g., computer processors or CPUs) are employed. In some instances, one or more of the units serves the role of a standby unit that is essentially idle until such time as it is necessary to replace an active unit. In other instances, multiple redundant units execute the same tasks simultaneously but independently. Unfortunately, in these other instances, the redundant units can, under certain circumstances, become out of phase with one another. In such circumstances it is necessary to re-coordinate or "resynchronize" the redundant units.

Coordination of redundant units has heretofore been addressed using various techniques. One known technique is to have the two redundant systems, e.g., two CPUs, using a same clock and same memory. In this technique, the two CPUs execute the same instructions out of the same memory at the same time, thereby obviating the need for software synchronization. A third unit compares the results from the two CPUs. A disadvantage of this technique is that its implementation requires specialized hardware rather than conventional components.

Employment of a third unit which coordinates synchronization of two processors is taught in U.S. Pat. No. 5,748,873 to Ohguro et al. When a first processor needs to resynchronize with a second processor, the first processor sends a re-synchronizing indication to a match control logic, which then outputs synchronous reset indication signals so that both the first and second processors are reset in synchronism.

Some redundant units (independently executing the same task) comprise state machines which are synchronized on the basis of external stimuli, such as bus events. But if one of the redundant units is reset (e.g., rebooted after a failure or the like), the reset unit somehow has to catch up with the other unit so that the tasks and any state machines of the reset unit can be synchronized. A possible solution to this synchronization problem is to ignore external stimuli and transfer all states from an active unit to the newly reset unit. Unfortunately, this solution would necessitate both units as appearing isolated, at least temporarily during the transfer of states, to external equipment communicating with the two units. If the overall system contains much state information, such resynchronization time might be unacceptably long.

What is needed, therefore, and an object of the present invention, is an effective way of resynchronizing redundant units which employ external stimuli-synchronized state machines.

BRIEF SUMMARY OF THE INVENTION

A redundant system comprises a first unit, a second unit, and a synchronization server. The first unit and a second unit each include plural state machines for performing tasks. At least some of the state machines provided at the first unit simultaneously perform same tasks as at least corresponding ones of some of the state machines provided at the second unit.

In accordance with the invention, when a state machine of a second unit determines that it needs to be resynchronized, the synchronization server receives a resynchronization request from the state machine requesting resynchronization and thereupon provides an out-of-synchronization indication to a corresponding state machine in the first unit. In response to the out-of-synchronization indication from the synchronization server, the corresponding state machine in the first unit generates a resynchronization request at an time deemed appropriate by the corresponding state machine in the first unit. In response to the resynchronization request from the corresponding state machine in the first unit, the synchronization server issues a resynchronization command to both the corresponding state machine in the first unit and the state machine requesting of the second unit which sought resynchronization. The state machines of the first and second units simultaneously resynchronize in response to the resynchronization command.

At least one of the first unit and the second unit includes a restart logic that prescribes an order of restart of the plural state machines when a unit is restarted or rebooted. This provides for a gradual start up of the state machines of the redundant units. Preferably, the prescribed order is on a basis of one state machine at a time. When a state machine is restarted, it is up to the individual state machine when to synchronize in accordance with the steps summarized above.

In an illustrated embodiment, the first unit and the second unit are situated in a node of a cellular telecommunications system, such as a base station (BTS) node, for example.

The synchronization server can be a distinct unit, or can be included in one of the first unit and the second unit.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 1C is a schematic view of a redundant system according to another embodiment of the invention wherein restart logic is located in a node distinct from a node of the first unit, the node of the second unit, or the node of the synchronization server.

DETAILED DESCRIPTION OF THE DRAWINGS

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well known devices, circuits, and methods are omitted so as not to obscure the description of the present invention with unnecessary detail.

Figure 1:
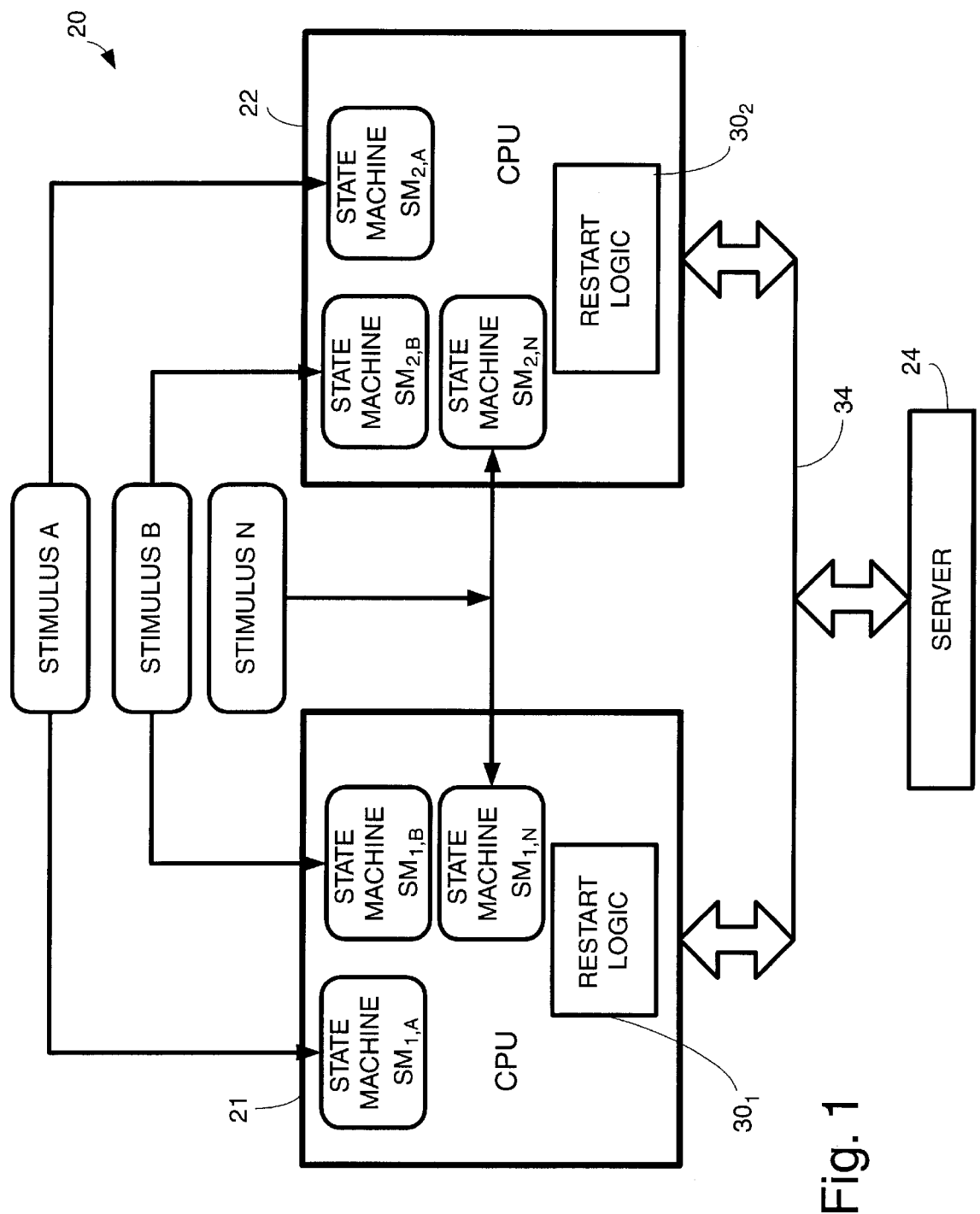
FIG. 1 is a schematic view of a redundant system according to a first embodiment of the invention.

FIG. 1 shows a redundant system 20 according to a first embodiment of the invention. The redundant system 20 includes first and second units, illustrated as first CPU 21 and second CPU 22, as well as resynchronization server 24. Each of first CPU 21 and second CPU 22 is preferably a processing unit such as a programmed microprocessor or the like. Each of first CPU 21 and second CPU 22 includes plural software state machines. As shown in FIG. 1, first CPU 21 has state machines $SM_{1,A}$, $SM_{1,B}$, ... $SM_{1,N}$ while second CPU 22 has state machines $SM_{2,A}$, $SM_{2,B}$, ... $SM_{2,N}$. Since system 20 is a redundant system, with first CPU 21 and second CPU 22 independently but (under normal circumstances) simultaneously execute the same tasks, state machine $SM_{1,A}$ of first CPU 21 performs the same task of state machine $SM_{2,A}$ of second CPU 22; state machine $SM_{1,B}$ of first CPU 21 performs the same task of state machine $SM_{2,B}$ of second CPU 22; and so forth in accordance with an alphabetically subscripted pattern. Thus, the redundancy of system 20 has the state machines of FIG. 1 provided in pairs, a first pair $SM_{1,A}$ and $SM_{1,B}$; a second pair $SM_{2,A}$ and $SM_{2,B}$; and so forth continuing to a $n^{th}$ pair $SM_{1,N}$ and $SM_{1,N}$.

Preferably one or more of the pairs of state machines shown in FIG. 1 are synchronized on the basis of external stimuli, such as bus events. FIG. 1 illustrates that a stimulus A is applied concurrently to state machine $SM_{1,A}$ and state machine $SM_{2,A}$; a stimulus B is applied concurrently to state machine $SM_{1,B}$ and state machine $SM_{2,B}$; and so forth. In normal operation, the state machines of each pair are maintained in synchronization by virtue of the fact that both state machines of the pair are simultaneously receiving the same stimulus.

Each of first CPU 21 and second CPU 22 also include restart logic. In FIG. 1, first CPU 21 is depicted as having restart logic $30_1$ while second CPU 22 is shown as having restart logic $30_2$.

Figure 1A:
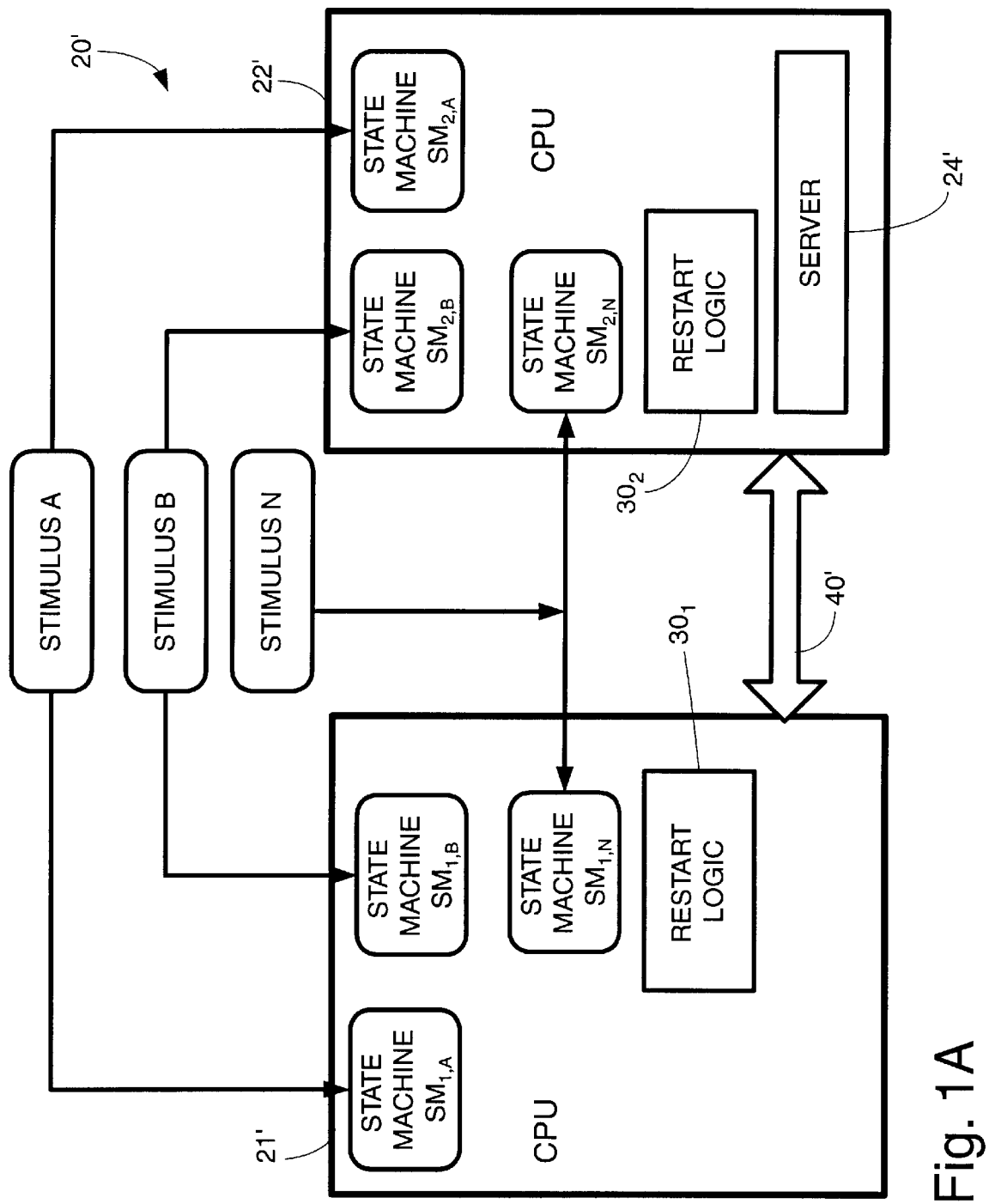
FIG. 1A is a schematic view of a redundant system according to another embodiment of the invention.

In the particular embodiment shown in FIG. 1, resynchronization server 24 is a separate unit distinct from first CPU 21 and second CPU 22 but connected to both first CPU 21 and second CPU 22 over a bus system 34. In FIG. 1A, by contrast, resynchronization server 24' is included in second CPU 22'. Such inclusion of resynchronization server 24' with second CPU 22' is the primary difference between the embodiments of FIG. 1 and FIG. 1A, it being understood that the analogous elements of the embodiment of FIG. 1A are shown with primed reference numerals relative to the FIG. 1 counterparts. The principles of operation of the invention, as further described herein, are understood to be equally applicable to both embodiments.

Figure 2:
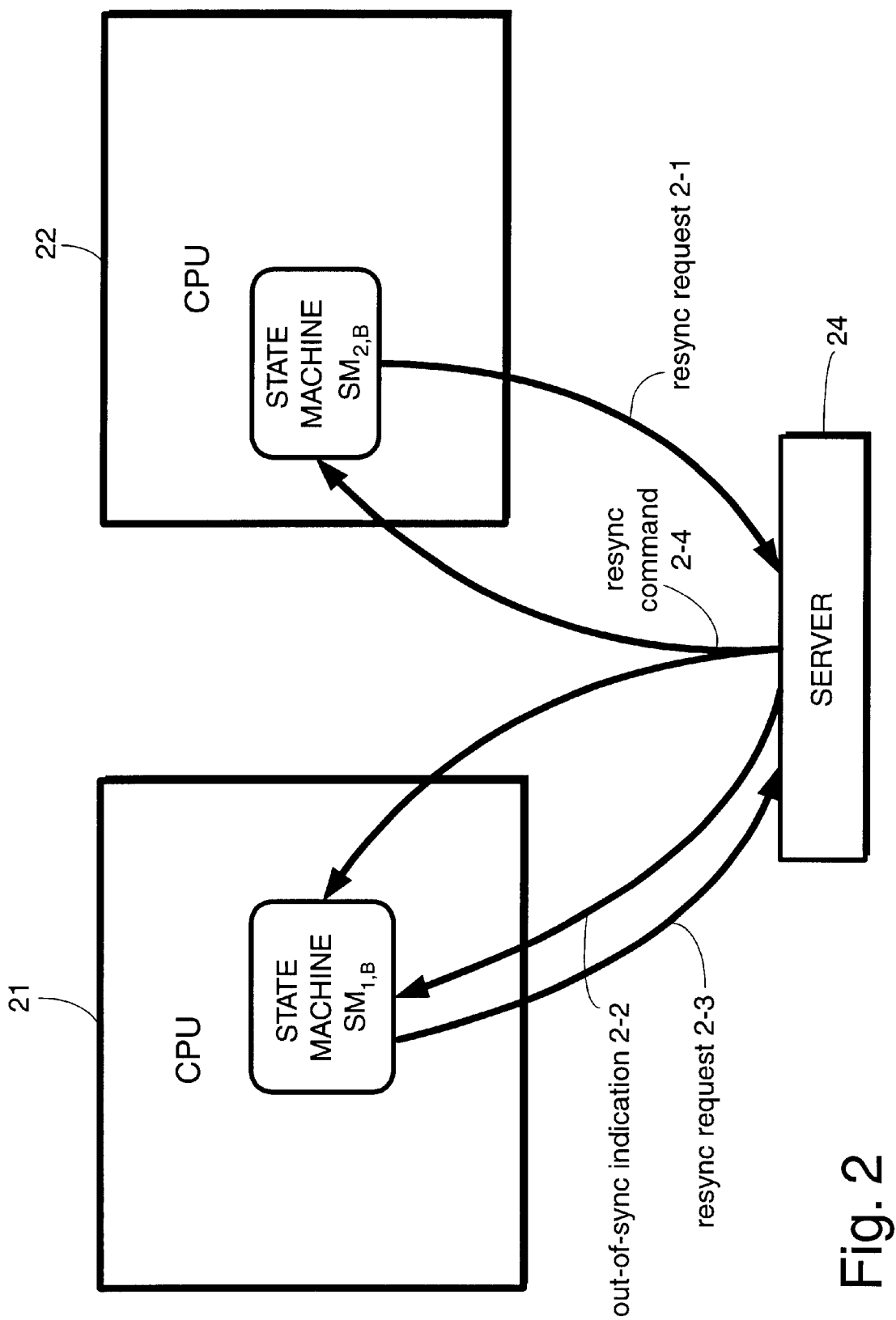
FIG. 2 is a schematic view showing a message scheme for resynchronization of a state machine for the embodiment of FIG. 1.

FIG. 2 shows a basic message scheme facilitating resynchronization in the context of the embodiment of FIG. 1. In the scenario depicted in FIG. 2, it is assumed that state machine $SM_{2,B}$ is out of synchronization, as determined by state machine $SM_{2,B}$ or otherwise. In such case, FIG. 2 shows state machine $SM_{2,B}$ sending a resynchronization request 2-1 on bus system 34 to resynchronization server 24. Upon receiving the resynchronization request 2-1, resynchronization server 24 provides an out-of-synchronization indication 2-2 to the corresponding state machine in CPU 21, i.e., state machine $SM_{1,B}$. Then, at an appropriate time as determined by state machine $SM_{1,B}$, and in response to the out-of-synchronization indication 2-2 from the resynchronization server 24, state machine $SM_{1,B}$ of first CPU 21 generates its own resynchronization request 2-3 which is sent to resynchronization server 24 over bus system 34. Then, having received both the resynchronization request 2-1 from both state machine $SM_{2,B}$ and the resynchronization request 2-3 from state machine $SM_{1,B}$, resynchronization server 24 issues a resynchronization command 2-4 which is applied to both state machine $SM_{1,B}$ of first CPU 21 and state machine $SM_{2,B}$ of second CPU 22. Upon receipt of the resynchronization command 2-4, both state machine $SM_{1,B}$ and state machine $SM_{2,B}$ are restarted. After restart of state machine $SM_{1,B}$ and state machine $SM_{2,B}$, synchronization is accomplished by the receipt of both state machines by bus events from stimulus B.

Figure 3:
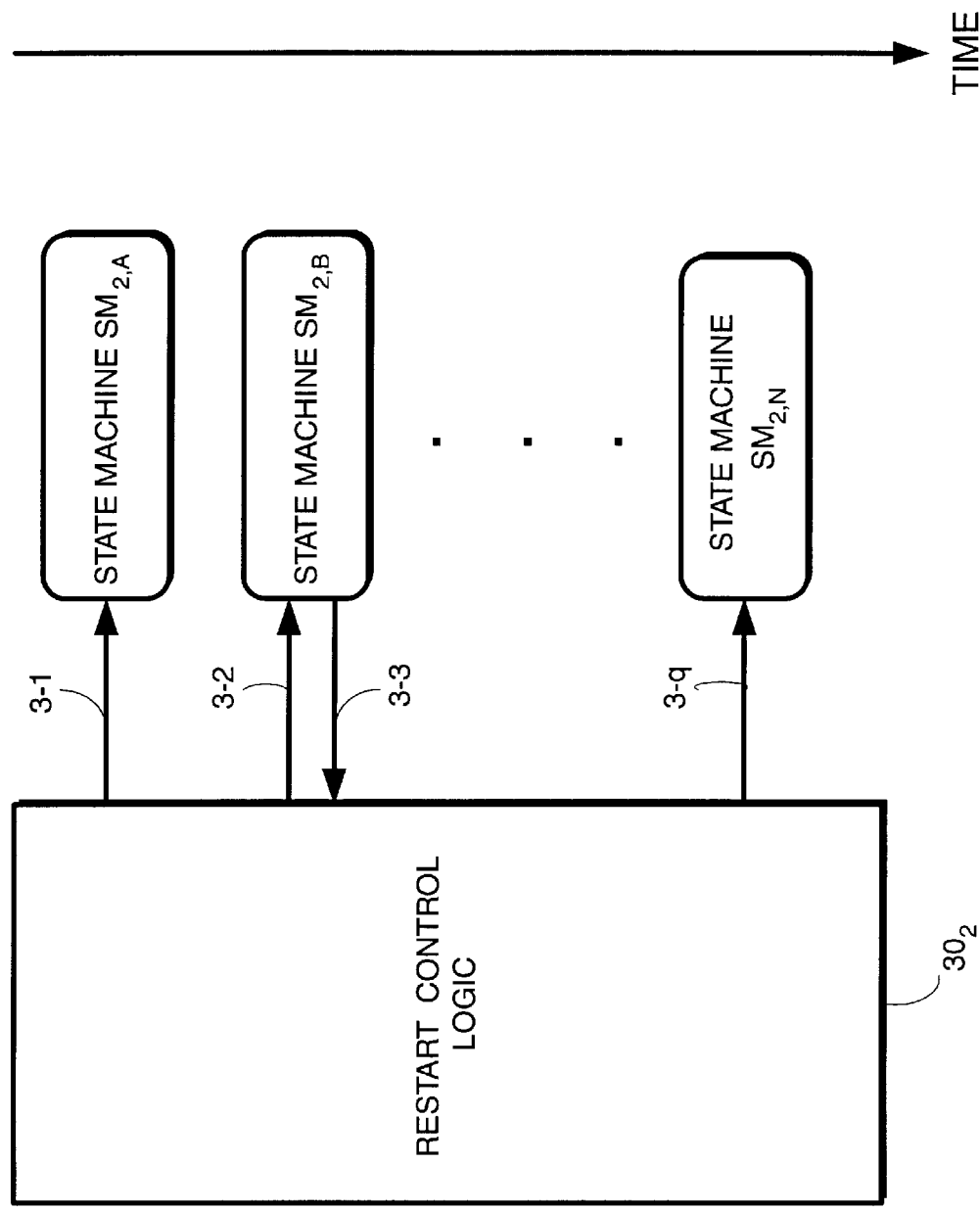
FIG. 3 is a schematic view illustrating a restart sequence according to one mode of the present invention.

In accordance with one mode of the present invention as illustrated in FIG. 3, when either first CPU 21 or second CPU 22 must be restarted or rebooted (e.g., after a system crash), the restart logic of each CPU has a prescribed order for initializing and executing the plural state machines. An example of such prescribed order is illustrated in FIG. 3, wherein a representative one of the restart logics (restart logic $30_2$) is shown along with prescribed time ordering of restart of the state machines for second CPU 22. In the example of FIG. 3, it is seen that restart logic $30_2$ first starts state machine $SM_{2,A}$ (indicated by action 3-1) before starting state machine $SM_{2,B}$, and that after starting state machine $SM_{2,B}$ (indicated by action 3-2) the restart and resynchronization logic $30_2$ must receive a predefined response or acknowledgement (indicated by action 3-3) prior to starting any other state machine. FIG. 3 shows that state machine $SM_{2,N}$ is started by action 3-$q$. Thus, in the particular mode illustrated herein, it so happens that the plural state machines of a CPU are restarted on a basis of one state machine at a time.

Figure 3A:
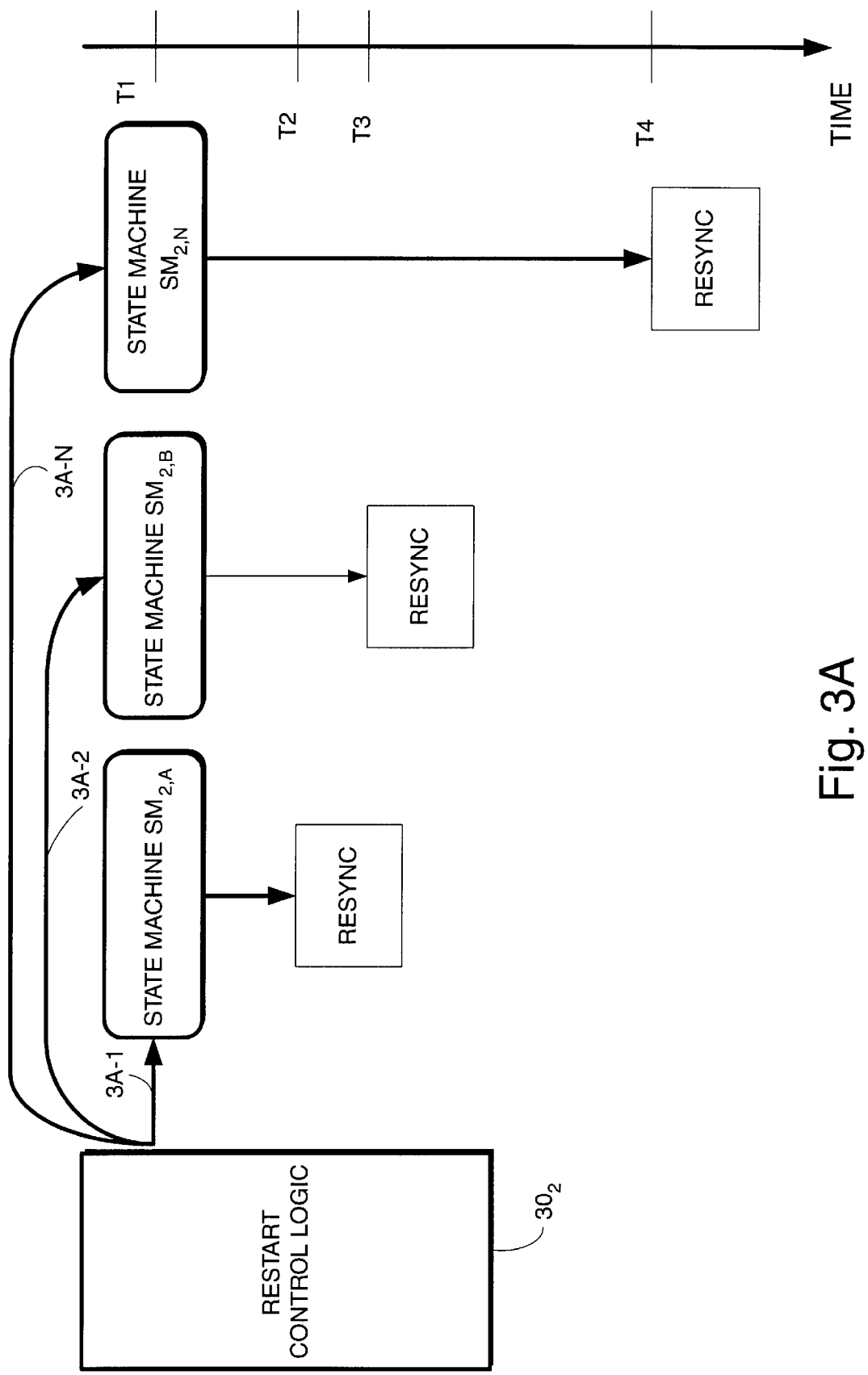
FIG. 3A is a schematic view illustrating a restart sequence another mode of the present invention.

In another mode of the invention, illustrated in FIG. 3A, when either first CPU 21 or second CPU 22 must be restarted or rebooted, each state machine on the rebooting CPU determines for itself when it will synchronize. In the particular scenario illustrated in FIG. 3A, restart control logic $30_2$ of second CPU 22 simultaneously starts each of state machines $SM_{2,A}$, $SM_{2,B}$, and $SM_{2,N}$, as indicated by arrows 3A-1 through 3A-N,respectively, at time T1. Thereafter, each state machine determines when it will begin its own resynchronization process. For example, state machine $SM_{2,A}$ determines that it will begin its resynchronization at time T2; state machine $SM_{2,B}$ determines that it will begin its resynchronization at time T3; state machine $SM_{2,N}$ determines that it will begin its resynchronization at time T4.

The following discussion of the resynchronization process is applicable both to the modes of FIG. 3 and FIG. 3A and variations thereof. As any one of the state machines of a CPU begins it resynchronization, the restarted state machine sends the resynchronization request 2-1 of FIG. 2 to resynchronization server 24, and the activities of FIG. 2 are performed relative to the restarted state machine and its corresponding or paired state machine in the other CPU. Thus, in the situation of a CPU restart, the resynchronization procedures and activities illustrated in FIG. 2 are conducted for each state machine in the restarted CPU which requires resynchronization.

Upon receipt of the out-of-synchronization indication 2-2, whether the corresponding state machine in the other CPU is in a position to resynchronize depends upon that corresponding state machine in the other CPU. In this regard, and as stated above, it was noted in FIG. 2 that the state machine of first CPU 21 generates its own resynchronization request 2-3 at a time deemed appropriate by the state machine of first CPU 21. In this regard, if the state machine of the first CPU 21 is conducting an important activity at the time it receives the out-of-synchronization indication 2-2, the state machine of first CPU 21 does not cease that important activity in deference to the out-of-synchronization indication 2-2. Rather, the state machine of first CPU 21 determines for itself when it has a satisfactory opportunity to resynchronize, e.g., when there are no critical activities currently being performed or critical external stimuli requiring attention. What is determined to be "critical" can be assessed by the state machine of first CPU 21 in accordance with predefined priorities. Thus, the state machine of first CPU 21 generates a resynchronization request only after the state machine of first CPU 21 has completed any activity of predefined priority.

Figure 4:
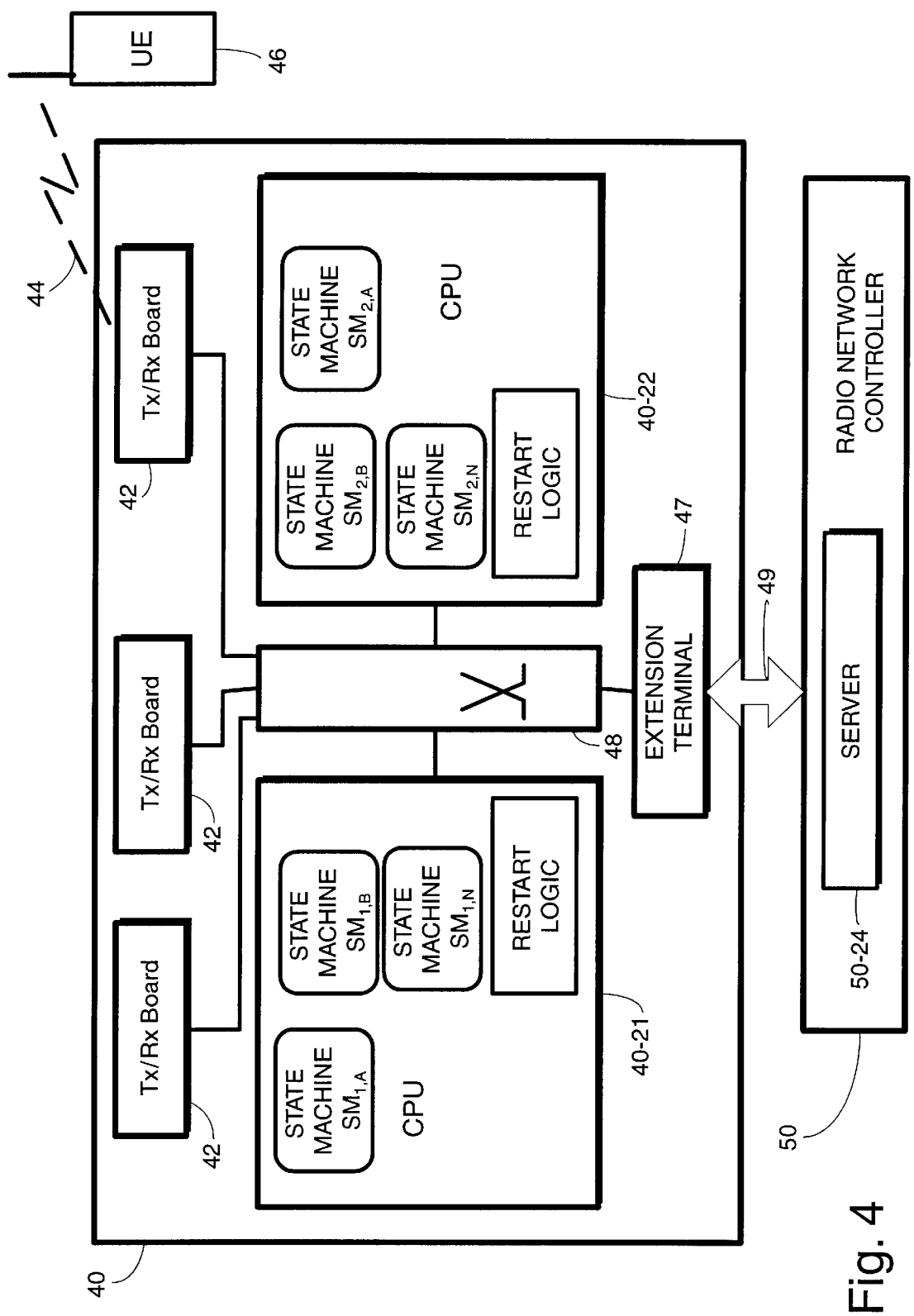
FIG. 4 is a schematic view showing implementation of the embodiment of FIG. 1 in a node of a cellular telecommunications system.

FIG. 4 shows an example implementation of the embodiment of FIG. 1 in a node of a cellular telecommunications system, particularly in a base station (BTS) 40. The base station (BTS) 40 comprises plural transmitter/receiver boards (Tx/Rx) 42 which communicate over air interface 44 with mobile stations, such as user equipment 46 shown in FIG. 4. Also included in base station (BTS) 40 are redundant units 40-21 and 40-22, which correspond basically to first CPU 21 and second CPU 22 of the FIG. 1 embodiment. The base station (BTS) 40 also has an extension terminal (ET) 47 and a switch 48.

In the particular example base station (BTS) 40 shown in FIG. 4, the switch 48 is an ATM (Asynchronous Transfer Mode) switch which routes ATM cells between boards attached to ports of the switch core. Thus, in the example shown in FIG. 4, each of transmitter/receiver boards (Tx/Rx) 42, redundant units 40-21 and 40-22, and extension terminal (ET) 47 are situated on circuit boards connected to corresponding ports of the core of switch 48. Although FIG. 4 shows the redundant units 40-21 and 40-22 as being connected directly to switch 48, it should be understood that redundant units 40-21 and 40-22 are rather situated on boards that are connected to switch 48, and that on such boards various other devices such as switch port interface circuits may be mounted intermediate the redundant units and switch 48.

The extension terminal (ET) 47 serves to connect base station (BTS) 40 over terrestrial link 49 to another node of the telecommunications system of FIG. 4, particularly to radio network controller (RNC) 50. In the illustration of FIG. 4, the resynchronization server 50-24, corresponding to resynchronization server 24 of the embodiment of FIG. 1, is situated in radio network controller (RNC) 50.

The structure and operation of examples nodes such as base station (BTS) 40 and radio network controller (RNC) 50 can be understood from, for example, the following United States Patent applications, all of which are incorporated herein by reference: U.S. patent application Ser. No. 09/188,102 for "Asynchronous Transfer Mode System"; U.S. patent application Ser. No. 09/035,821 for "Telecommunications Inter-Exchange Measurement Transfer"; U.S. patent application Ser. No. 09/035,788 for "Telecommunications Inter-Exchange Congestion Control"; and U.S. patent application Ser. No. 09/071,886 for "Inter-Exchange Paging".

In the particular example shown in FIG. 4, the redundant units 40-21 and 40-22 can perform various activities for base station (BTS) 40, including various control functions. One such function is performing radio link measurements, e.g., power measurements for each connection over air interface 44 and determining signal to noise ratios for the radio link with respect to each connection. Such information is important in mobile communications such as CDMA mobile communications for diversity and soft handover from one base station to another base stations. Involvement with such a measurement may, in fact, be one of the critical operations performed by one of the state machines of the redundant units which must be handled prior to sending a resynchronization request 2-3. In the embodiment of FIG. 4, each of the state machines SM of the CPUs handles or is associated with a radio channel or an ATM link.

Figure 1B:
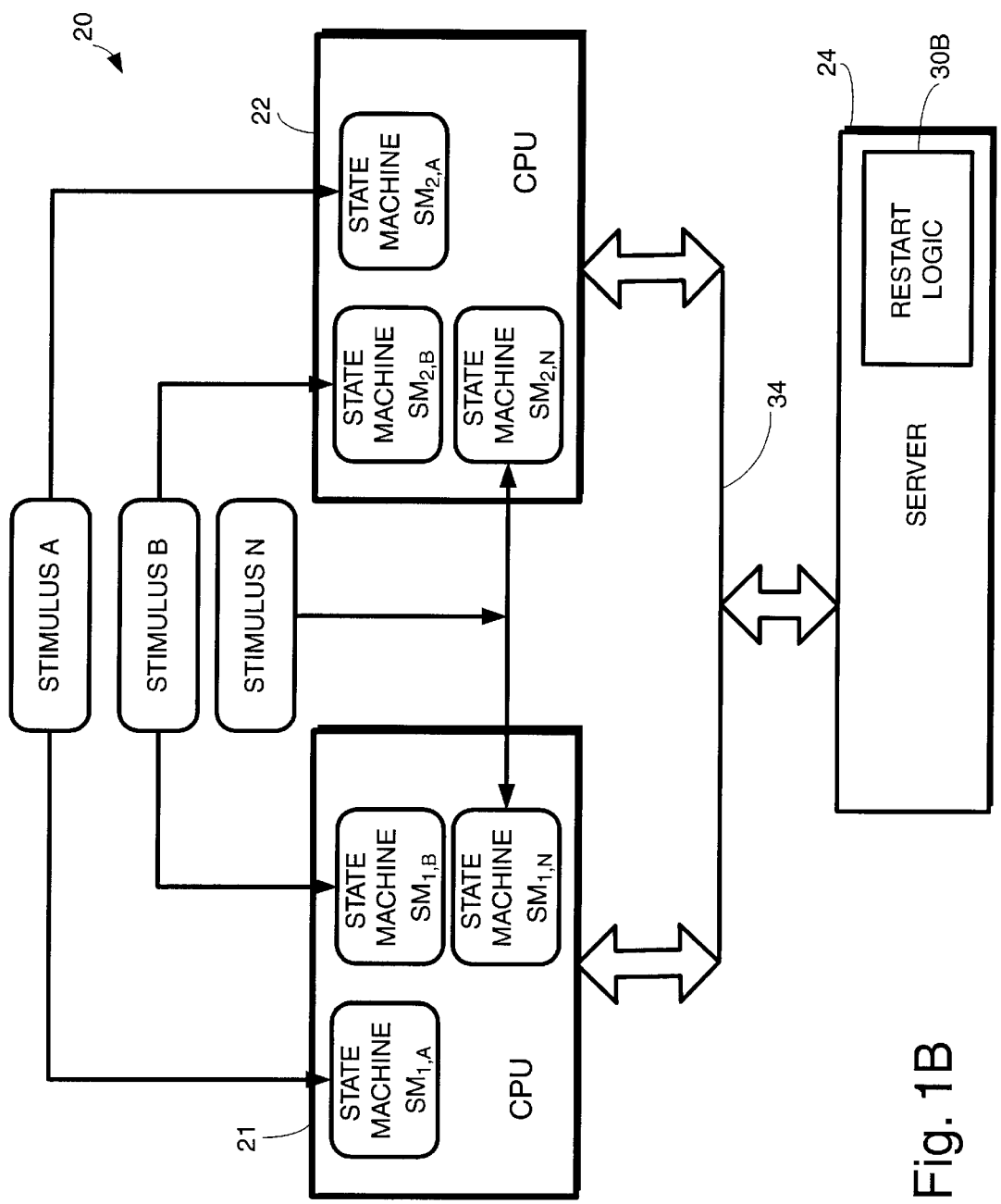
FIG. 1B is a schematic view of a redundant system according to another embodiment of the invention wherein restart logic is located in a synchronization server node.

FIG. 1B shows another embodiment of the invention wherein restart logic 30B is located in a synchronization server 24. The resynchronization server 24 can be either a distinct node as shown in FIG. 1 and FIG. 1B, or in one of the unit nodes 21 or 22 as shown in FIG. 1A. FIG. 1C shows yet another embodiment of the invention wherein restart logic 30C is located in a node 60 which is distinct from a node of the first unit 21, the node of the second unit 22, or the node of the synchronization server 24. In both the FIG. 1B and FIG. 1C embodiment, the restart logic learns that a CPU needs to be rebooted, for example, and sends restart messages to each state machine. An illustration of the sending of such restart messages is provided by arrow 1C-1 in FIG. 1C. It should be understood that the restart messages can be sent in a predefined sequence in the manner of FIG. 3, or simultaneously in the manner of FIG. 3A. The synchronization of each state machine is understood with reference to FIG. 2 as discussed above.

Thus, the present invention starts up the state machines of a reset unit in a gradual, predefined manner which allows each state machine to decide by itself when it should be synchronized. Moreover, the present invention provides a scheme for the state machines to employ a third party, e.g., the server 24, in the resynchronization process. Of course, the reset unit must know what state machines are to be restarted, and in what order or sequence or logic pattern.

Thus, when one of the CPUs (e.g., a standby CPU) needs to be restarted, the gradual restarting of the present invention will never leave the other or active CPU appearing lost relative to the outside world. The only part of the overall system which will seem lost relative to its external environment is any state machine which is currently resynchronizing itself. But by letting each state machine decide when to perform resynchronization, the time that the state machine seems lost is negligible (since the state machine itself may know or anticipate the best time for it to resynchronize).

It should be understood, that the term "unit" as employed herein is not necessarily confined to a processor which executes programmed instructions, but extends to any type of logic device or circuit which supervises plural state machines. Nor does the fact that the state machines illustrated herein are realized in software preclude the invention from applying to hardware or circuit-formed state machines which utilize the resynchronization principles of the present invention.

Nor should particular significance be attached to the fact that the state machines illustrated herein are depicted as receiving only one stimulus. Such simplified illustration has been provided merely for purposes of clarity. Plural stimulus applied to state machines is certainly envisioned by the present invention.

The location of resynchronization server 24 and resynchronization server 24' as described herein is not limiting in the sense that the person skilled in the art will realize the resynchronization servers can be situated and connected in other manners, e.g., that other elements can be connected between resynchronization server and one or more of the CPUs.

Moreover, the illustration provided in FIG. 4 of an ATM-based base station (BTS) is but one example of how the present invention can be implemented in a node of a telecommunications system. The node for implementation need not be a base station, but can be other nodes such as the radio network controller (RNC) node, for example. Moreover, it should be understood that employment of the present invention is certainly not linked to employment of ATM or any other particular protocol. The present invention can be utilized to synchronize SSCOP links, radio links and other links in a redundant system.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A redundant system comprising:
   a first unit and a second unit each including plural state machines for performing tasks, at least some of the state machines provided at the first unit simultaneously performing same tasks as at least corresponding ones of some of the state machines provided at the second unit;
   a synchronization server which receives a resynchronization request from a resync requesting state machine of the second unit and thereupon provides an out-of-synchronization indication to a corresponding state machine of the first unit;
   wherein in response to the out-of-synchronization indication from the synchronization server, the corresponding state machine of the first unit generates a resynchronization request;
   wherein in response to the resynchronization request from the state machine of the first unit, the synchronization server issues a resynchronization command to both the corresponding state machine of the first unit and the resync requesting state machine of second unit;
   wherein the resync requesting state machine of second unit and the corresponding state machine of the first unit simultaneously resynchronize in response to the resynchronization command.

2. The apparatus of claim 1, wherein the corresponding state machine of the first unit generates a resynchronization request only after the corresponding state machine of the first unit has completed an activity of predefined priority.

3. The apparatus of claim 1, wherein at least one of the first unit and the second unit includes a restart logic that prescribes an order of restart of the plural state machines.

4. The apparatus of claim 3, wherein the restart logic prescribes restart of the plural state machines on a basis of one state machine at a time.

5. The apparatus of claim 1, wherein at least one of the synchronization server and a third unit includes a restart logic that prescribes an order of restart of the plural state machines.

6. The apparatus of claim 5, wherein the restart logic prescribes restart of the plural state machines on a basis of one state machine at a time.

7. The apparatus of claim 1, wherein restart logic restarts plural state machines of a unit, and wherein upon restart each state machine of the unit decides when it will resynchronize.

8. The apparatus of claim 1, wherein the first unit and the second unit are situated in a node of a cellular telecommunications system.

9. The apparatus of claim 1, wherein the synchronization server is included in one of the first unit and the second unit.

10. The apparatus of claim 1, wherein the synchronization server is situated at a node which does not include the first unit or the second unit.

11. The apparatus of claim 1, wherein at least some of state machines at the first unit and the second unit are synchronized by external stimuli.

12. A method of operating a redundant system having a first unit and a second unit, each of the first unit and the second unit including plural state machines for performing tasks, at least some of the state machines provided at the first unit simultaneously performing same tasks as at least corresponding ones of some of the state machines provided at the second unit; the method comprising the following steps:
   (1) receiving, at a synchronization server, a resynchronization request from a resync requesting state machine of the second unit;
   (2) in response to step (1), providing an out-of-synchronization indication to a corresponding state machine of the first unit;
   (3) in response to step (2), generating at the corresponding state machine of the first unit a corresponding state machine resynchronization request;
   (4) in response to step (3), issuing from the synchronization server a resynchronization command to both the resync requesting state machine of the second unit and the first unit and the corresponding state machine of the first unit;
   (5) simultaneously resynchronizing the resync requesting state machine of the second unit and the corresponding state machine of the first unit in response to the resynchronization command.

13. The method of claim 12, further comprising performing step (3) only after the corresponding state machine of the first unit has completed an activity of predefined priority.

14. The method of claim 12, further comprising restarting the plural state machines of at least one of the first unit and the second unit in accordance with a predefined order.

15. The method of claim 14, further comprising restarting the plural state machines of at least one of the first unit and the second at a rate of one state machine at a time.

16. The method of claim 12, further comprising restart logic restarting plural state machines of a unit, and wherein upon restart each state machine of the unit decides when it will resynchronize.

17. The method of claim 12, further comprising situating the first unit and the second unit in a node of a cellular telecommunications system.

18. The method of claim 12, further comprising including the synchronization server in one of the first unit and the second unit.

19. The method of claim 12, further comprising including the synchronization server in one of the synchronization server and a third unit.

20. The method of claim 12, further comprising using external stimuli to synchronize at least some of state machines at the first unit and the second unit during normal operation.

21. A telecommunications system comprising:

a node having a redundant system having a first unit and a second unit each including plural state machines for performing tasks of the node, at least some of the state machines provided at the first unit simultaneously performing same tasks as at least corresponding ones of some of the state machines provided at the second unit;

a synchronization server which receives a resynchronization request from a resync requesting state machine of the second unit and thereupon provides an out-of-synchronization indication to a corresponding state machine of the first unit;

wherein in response to the out-of-synchronization indication from the synchronization server, the corresponding state machine of the first unit generates a resynchronization request;

wherein in response to the resynchronization request from the corresponding state machine of the first unit, the synchronization server issues a resynchronization command to both the resync requesting state machine of the second unit and the corresponding state machine of the first unit;

wherein the resync requesting state machine of the second unit and the corresponding state machine of the first unit simultaneously resynchronize in response to the resynchronization command.

22. The apparatus of claim 21, wherein the corresponding state machine of the first unit generates a resynchronization request only after the corresponding state machine of the first unit has completed an activity of predefined priority.

23. The apparatus of claim 21, wherein at least one of the first unit and the second unit includes restart logic that prescribes an order of restart of the plural state machines.

24. The apparatus of claim 21, wherein the restart logic prescribes restart of the plural state machines on a basis of one state machine at a time.

25. The apparatus of claim 21, wherein restart logic restarts plural state machines of a unit, and wherein upon restart each state machine of the unit decides when it will resynchronize.

26. The apparatus of claim 21, wherein the synchronization server is included in one of the first unit and the second unit.

27. The apparatus of claim 21, wherein at least some of state machines at the first unit and the second unit are synchronized by external stimuli.

28. A method of operating a telecommunications system comprising a node having a redundant system including a first unit and a second unit, each of the first unit and the second unit including plural state machines for performing tasks of the node, at least some of the state machines provided at the first unit simultaneously performing same tasks as at least corresponding ones of some of the state machines provided at the second unit; the method comprising the following steps:

(1) receiving, at a synchronization server, a resynchronization request from a resync requesting state machine of the second unit;

(2) in response to step (1), providing an out-of-synchronization indication to a corresponding state machine of the first unit;

(3) in response to step (2), generating at the corresponding state machine of the first unit a corresponding resynchronization request;

(4) in response to step (3), issuing from the synchronization server a resynchronization command to both the resync requesting state machine of the second unit and the corresponding state machine of the first unit;

(5) simultaneously resynchronizing the resync requesting state machine of the second unit and the corresponding state machine of the first unit in response to the resynchronization command.

29. The method of claim 28, further comprising performing step (3) only after the corresponding state machine of the first unit has completed an activity of predefined priority.

30. The method of claim 28, further comprising restarting the plural state machines of at least one of the first unit and the second unit in accordance with a predefined order.

31. The method of claim 30, further comprising restarting the plural state machines of at least one of the first unit and the second at a rate of one state machine at a time.

32. The method of claim 28, further comprising restart logic restarting plural state machines of a unit, and wherein upon restart each state machine of the unit decides when it will resynchronize.

33. The method of claim 28, further comprising including the synchronization server in one of the first unit and the second unit.

34. The method of claim 28, further comprising using external stimuli to synchronize at least some of state machines at the first unit and the second unit during normal operation.

* * * * *